UNITED STATES PATENT OFFICE.

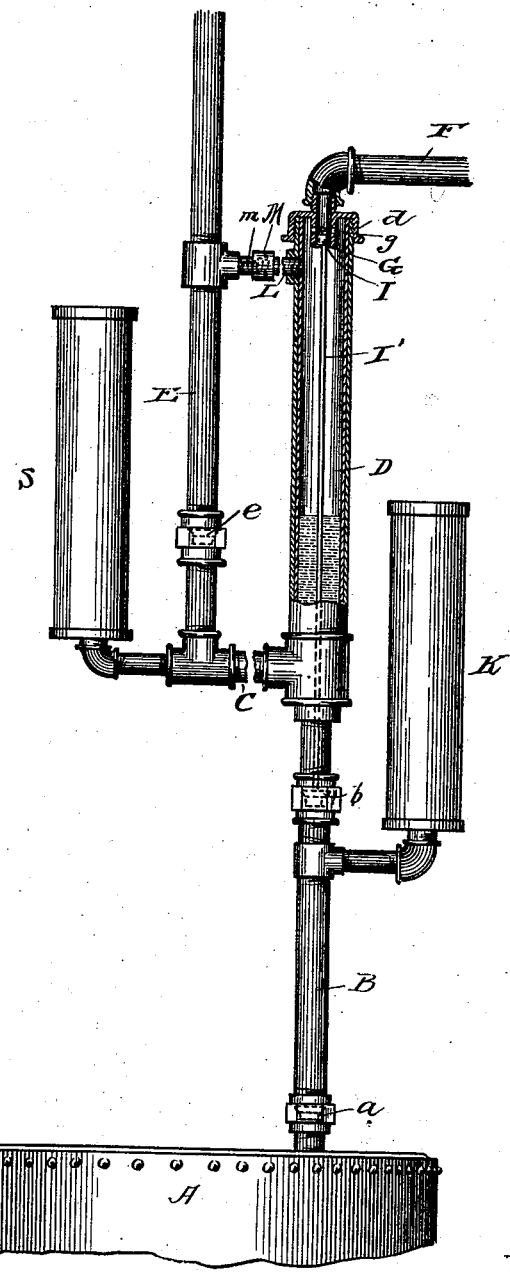

WILLIAM KIRKWOOD, OF CHICAGO, ILLINOIS.

VACUUM-PUMP.

SPECIFICATION forming part of Letters Patent No. 546,617, dated September 17, 1895.

Application filed April 23, 1894. Serial No. 508,620. (No model.)

*To all whom it may concern:*

Be it known that I, WILLIAM KIRKWOOD, a subject of the Queen of Great Britain, residing at Chicago, in the county of Cook and State of Illinois, have invented certain new and useful Improvements in Devices for Raising Water, of which the following is a specification.

My device depends for its operation upon the joint and successive action of the following forces or agencies: pressure of steam, condensation of steam, vacuum produced by the expulsion of water and condensation of steam, and atmospheric pressure upon the surface of the water in refilling said vacuum.

The construction of my invention is explained by reference to the accompanying drawing, which represents a side elevation thereof, part in section.

A of the drawing represents a tank or reservoir from which the water to be elevated is drawn.

B is a suction-pipe leading from near the bottom of the tank A to the vacuum-chamber D.

$a$ is an upward-opening check-valve which is preferably located near the lower end of the pipe B to prevent the return of the water to the tank. For convenience of representation the check-valve $a$ is shown above the tank A. A second check-valve $b$ is interposed between the vacuum-chamber and the check-valve $a$.

E is a discharge-pipe connected with the vacuum-chamber D by a branch pipe or duct C.

$e$ is a check-valve located at the lower end of the pipe E to prevent the return of the water therefrom to the vacuum-chamber. A steam-supply pipe F communicates with the vacuum-chamber at its upper end through the cap or cover $d$. The lower side of said cap or cover is provided with a short cylindrical sleeve G, through which is a central vertical port for the passage of steam from the steam-pipe to the vacuum-chamber. The sleeve G is provided with horizontal perforations $g$ at a slight distance above its lower end for the passage of steam, whereby the steam, as it enters said sleeve, is caused to pass out horizontally and discharge against the sides of the vacuum-chamber, thereby preventing it from penetrating the surface of the water, as it would otherwise do were it discharged directly downward upon its surface. That part of the port in the sleeve G below the horizontal perforations $g$ serves as a guide-bearing to the slide-valve I and the valve-rod I'. The slide-valve I and the valve-rod I' are supported from and actuated by the check-valve $b$.

When the device is in operation, the valve-rod I' and the slide-valve I have a vertical reciprocating movement within the vacuum-chamber D, motion being communicated from the check-valve $b$ to the slide-valve I through the valve-rod I'. When the check-valve $b$ is at rest upon its seat, the valve I is brought below the horizontal perforations $g$, whereby the steam is admitted into the vacuum-chamber D. When said check-valve $b$ is thrown upward by the admission of water, as hereinafter explained, said valve I is thrown upward past said horizontal perforations $g$, thereby cutting off the admission of steam. Thus, with each upward and downward movement of the check-valve $b$, steam is alternately cut off and admitted into the vacuum-chamber D.

The side walls of the vacuum-chamber are preferably lined with vulcanized rubber or other non-conductor of heat, so as to prevent too rapid condensation of steam. An air-receiver K, or other equivalent form of reservoir, is connected with the inlet-pipe B below the check-valve $b$. In starting the device, this reservoir K will contain a body of air, which by the action of the steam will be partially exhausted, thus permitting the water to flow into it and thereby maintaining a head or supply of water adjacent to the upper check-valve $b$, from which the suction created by the vacuum will draw its initial supply into the vacuum-chamber.

To prevent the concussion or pounding noise of the water as it is being elevated, a relief-valve M may, if desired, be employed where such noise is objectionable. This relief-valve M is located in the branch duct L, which communicates between the upper end of the vacuum-chamber and the discharge-pipe E. The valve M is retained in its seat against the steam-pressure by the spring $m$, and the tension of the spring is sufficient to hold the valve in its seat against the normal pressure of the water, but will, under excessive pressure or impact of the water, as it is thrown with great velocity against it, be opened slightly at the instant of such impact or action, thus permitting a small quantity of water to pass direct from the upper end of said vacuum-chamber, through the branch duct L, into the discharge-pipe E, whereby the concussion and pounding noise is diminished.

In starting the apparatus, before the pipes and chambers have been filled, it is necessary to apply the steam for a short time intermittingly.

The hand-actuated steam-controlling valve (not shown) being opened for a moment, steam enters the vacuum-chamber D, displacing air and causing it to pass out through the check-valve e and pipe E. The steam-controlling valve is then closed by the operator for a moment and the steam in the vacuum-chamber condenses, forming a partial vacuum, causing the water from the reservoir A to rise in the pipe B. Each time the steam-controlling valve is thus opened and closed the water will be caused to rise higher and higher until it reaches and fills the vacuum-chamber D and the auxillary chambers S and K. When these chambers are thus filled the hand-actuated steam-controlling valve may be left open, as the steam will be alternately admitted and excluded by the automatic action of the steam-valve.

The automatic action of the device is as follows: The hand-actuated steam-valve being open, the steam passes the open valve I and is brought to bear upon the surface of the water in the chamber D, thus forcing it rapidly out through the branch pipe C and the pipe E. The rapid movement thus imparted to the water carries it forward and upward in the pipe E. The instant the water is thus forced to a higher level than its exit-duct, the steam rushes beneath and upward through it, whereby it is instantly condensed and a partial vacuum produced in the vacuum-chamber. The vacuum thus formed causes the water in the reservoir A to instantly rush up into the chamber D, and in so doing it raises the check-valve b, whereby the valve-rod I', which rests upon said check-valve, and the steam-valve I, are raised, the inlet steam-ports g are closed, and the steam cut off and excluded. The steam being thus excluded, the water continues to rise until the chamber D is filled therewith. The chamber D being filled, the water ceases to support the check-valve b in its open position, when it drops back of its own gravity, together with that of the valve-rod I', which rests thereon, whereby the steam-valve I is again opened. With the re-opening of the steam-valve I steam is again admitted. Thus the steam-valve is alternately opened and closed, and the action described is continuously repeated so long as the supply of steam is maintained.

While the chambers K and S are important auxiliaries in starting the device and in maintaining a uniform flow of water, they are not essential elements.

In operating the machine steam is admitted to the vacuum-chamber through a very small aperture, usually about one-eighth of an inch in diameter, in a small-sized pump, when, acting on the surface of the water in the chamber D, it forces it below the discharge-orifice, which is about one and one-half inches in diameter. While water is an almost impenetrable barrier to steam acting downward upon its surface, it is scarcely any obstruction to steam beneath it. As a consequence the steam, as soon as it reaches the level of the water-discharge orifice, is free to escape, which it does with a quick explosive force, and as the area of the opening for its escape through such discharge is about one hundred and forty-four times greater than the inlet steam-port, an instantaneous diminution of pressure occurs the instant it escapes, whereby a partial vacuum is formed, which causes the inlet check-valve below to rise. A slight upward movement of about one-eighth of an inch of such check-valve will close the steam-valve, when the remaining steam is almost instantaneously condensed and the vacuum-chamber refilled with water.

In operating the device it is preferably located within about ten or twelve feet of the surface of the water supply, when it will be filled by vacuum or atmospheric pressure and the water will be elevated therefrom to any desired height corresponding with the pressure of the steam, less the ordinary loss of power from friction and condensation. For example, thirty pounds of steam pressure will communicate a pressure of about twenty-five pounds to the water, whereby the water will be raised to the height of about fifty feet.

Having thus described my invention, what I claim as new, and desire to secure by Letters Patent, is—

1. In a single acting steam pump, the combination with a single vacuum chamber having a steam inlet port, a valve controlling said port, a water controlling valve located at the opposite end of said chamber and a connection between said valves, whereby the vacuum causes the movement of the second valve, and thereby the first is actuated to cut off the steam, substantially as described.

2. In a single acting steam pump, the combination with a vacuum chamber having a steam inlet port or duct, provided with radial openings above or at a slight distance from its lower end, a steam controlling valve having a reciprocating movement in said duct upward and downward past said radial openings and adapted to cut off the steam as it is raised above said openings, without contact with seat or other bearings, and to admit steam as it is moved in the opposite direction below said openings, and a connecting rod communicating between said steam controlling valve and the inlet water controlling valve, substantially as and for the purpose specified.

3. In a single acting steam pump, the combination with a single vacuum chamber having a steam inlet port, a steam controlling valve located in said port, an inlet water controlling valve, a connection between said steam and water controlling valves, said valves being adapted to alternately act upon each other through said connection as the pump is operated, and a discharge duct provided with a check valve to permit the escape and prevent the return of the discharged water, substantially as described.

4. In a pump, the combination with a single vacuum chamber having a steam inlet controlled by a slide valve, a water controlling valve located at the opposite end of the chamber, a rod connecting said valves, a water inlet pipe, and a reservoir connected therewith, and a discharge pipe communicating with the vacuum chamber, substantially as described.

5. In a pump, the combination with a single vacuum chamber having suitable induction and eduction ports for water, a steam inlet, a valve controlling the steam inlet and a second valve at the opposite end of the chamber, a connection between the said valves, a pipe or passage connecting the upper end of the vacuum chamber with the discharge pipe, and a relief valve arranged in said pipe, substantially as described.

WILLIAM KIRKWOOD.

Witnesses:
C. C. LINTHICUM,
N. M. BOND.